(12) United States Patent
Toyoda et al.

(10) Patent No.: US 11,648,724 B2
(45) Date of Patent: May 16, 2023

(54) LIQUID CONTAINER MANUFACTURING METHOD

(71) Applicant: YOSHINO KOGYOSHO CO., LTD., Tokyo (JP)

(72) Inventors: Tamotsu Toyoda, Tokyo (JP); Shigeki Morikami, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 100 days.

(21) Appl. No.: 16/611,195

(22) PCT Filed: Apr. 11, 2018

(86) PCT No.: PCT/JP2018/015287
§ 371 (c)(1),
(2) Date: Nov. 5, 2019

(87) PCT Pub. No.: WO2018/221028
PCT Pub. Date: Dec. 6, 2018

(65) Prior Publication Data
US 2020/0189170 A1 Jun. 18, 2020

(30) Foreign Application Priority Data
May 30, 2017 (JP) .............................. JP2017-106943

(51) Int. Cl.
*B29C 49/12* (2006.01)
*B29C 49/06* (2006.01)
(Continued)

(52) U.S. Cl.
CPC .............. *B29C 49/12* (2013.01); *B29C 49/06* (2013.01); *B29C 49/58* (2013.01); *B29C 49/783* (2013.01);
(Continued)

(58) Field of Classification Search
CPC ......... B29C 49/12; B29C 49/06; B29C 49/58; B29C 49/783; B29K 2067/003; B29L 2031/7158
See application file for complete search history.

(56) References Cited

U.S. PATENT DOCUMENTS 10,836,094 B2 * 11/2020 Okuyama ............... B29C 49/18
2012/0207872 A1 8/2012 Lisch et al.
2013/0106028 A1 5/2013 Lisch et al.

FOREIGN PATENT DOCUMENTS

DE 10 2012 105 999 A1 1/2014
DE 10 2014 016 140 A1 5/2016
(Continued)

OTHER PUBLICATIONS

Jun. 26, 2018 International Search Report issued in International Patent Application No. PCT/JP2018/015287.
(Continued)

*Primary Examiner* — Alison L Hindenlang
*Assistant Examiner* — Shibin Liang
(74) *Attorney, Agent, or Firm* — Oliff PLC

(57) ABSTRACT

A liquid container manufacturing method of manufacturing a liquid container that contains a content liquid from a synthetic resin preform, the method including an inflation body insertion step of inserting an inflation body into the preform; an air discharge step of discharging air out of the preform by inflating an inflation body in the preform; a mouth blocking step of blocking a mouth of the preform; an inflation body contraction step of contracting the inflation body with the mouth blocked; and a liquid blow molding step of molding the preform into a liquid container by supplying a pressurized liquid into the preform through a blow nozzle.

9 Claims, 12 Drawing Sheets

(51) Int. Cl.
  *B29C 49/58* (2006.01)
  *B29C 49/78* (2006.01)
  *B29K 67/00* (2006.01)
  *B29L 31/00* (2006.01)

(52) U.S. Cl.
  CPC . *B29K 2067/003* (2013.01); *B29L 2031/7158* (2013.01)

(56) References Cited

FOREIGN PATENT DOCUMENTS

| | | | |
|---|---|---|---|
| JP | 5806929 B2 | 11/2015 | |
| WO | 2004/098862 A2 | 11/2004 | |
| WO | 2016066276 * | 5/2016 | ............. B29C 49/46 |

OTHER PUBLICATIONS

Feb. 9, 2021 Extended Search Report issued in European Patent Application No. 18810813.8.

* cited by examiner

LIQUID CONTAINER MANUFACTURING METHOD

TECHNICAL FIELD

The present disclosure relates to a liquid container manufacturing method of manufacturing a liquid container that contains a content liquid from a synthetic resin preform.

BACKGROUND

Synthetic resin containers, representatives of which are polypropylene (PP) bottles and polyethylene terephthalate (PET) bottles, are used in applications in which a variety of liquids such as beverages and toiletries including cosmetics, chemicals, detergents, shampoos or the like are contained as a content liquid. Such containers are generally manufactured by blow molding a preform formed by a thermoplastic synthetic resin material described above.

As the blow molding in which a preform is molded into a container, the liquid blow molding is known, in which, as a pressurized medium supplied into a preform, a pressurized liquid is used instead of the pressurized air.

For example, Patent Literature 1 (PTL 1) discloses a liquid blow molding method in which a synthetic resin preform heated in advance to a temperature at which stretchability is achieved is placed into a mold for blow molding and a liquid pressurized to a predetermined pressure by a pump is supplied into the preform through a blow nozzle. In this manner the preform is molded into a container having a predetermined shape conforming to a cavity of the mold for blow molding.

In the above described liquid blow molding method, as a liquid supplied into a preform, a content liquid such as beverage contained finally in a container as a product is used, and molding of a container and filling of a content liquid are performed at the same time. In this manner a liquid container that contains a content liquid can be manufactured. Therefore, according to the liquid container manufacturing method using the liquid blow molding described above, a step of filling a content liquid into a container after molding is omitted, and a liquid container can be manufactured at a low cost.

CITATION LIST

Patent Literature

PTL 1: JP5806929 B2

SUMMARY

Technical Problem

However, in the above described conventional liquid blow molding method, a liquid as a pressurized medium is supplied into a preform while catching the air present in the preform. Therefore it is likely that a problem of reduction in stability of molding conditions and moldability of a container may occur due to foaming of the liquid.

The present disclosure has been conceived in view of the above described problem, and is to provide a liquid container manufacturing method by which a liquid container having a predetermined capacity and a shape can be manufactured precisely and at a low cost.

Solution to Problem

The disclosed liquid container manufacturing method is a liquid container manufacturing method of manufacturing a liquid container that contains a content liquid from a synthetic resin preform, the method includes: an inflation body insertion step of inserting an inflation body into the preform placed in a mold for blow molding; an air discharge step of discharging the air out of the preform by inflating the inflation body in the preform; a mouth blocking step of blocking a mouth of the preform with the inflation body inflated in the preform; an inflation body contraction step of contracting the inflation body with the mouth blocked; and a liquid blow molding step of molding the preform into a liquid container having a shape conforming to an inner surface of the mold for blow molding by supplying a pressurized liquid into the preform through a blow nozzle.

In the disclosed liquid container manufacturing method configured in the above described manner, it is preferable that the method further includes a rod stretching step of axially stretching the preform by a stretching rod before or during the liquid blow molding step, in which the inflation body is provided to the stretching rod.

In the disclosed liquid container manufacturing method configured in the above described manner, it is preferable that the method further includes a rod withdrawing step of separating the stretching rod from the liquid container after the liquid blow molding step.

In the disclosed liquid container manufacturing method configured in the above described manner, it is preferable that the method further includes, after the liquid blow molding step, a liquid discharge step of discharging a predetermined amount of liquid from the liquid container after molding through the blow nozzle; and a headspace forming step of generating a predetermined amount of headspace in the liquid container by separating the blow nozzle from the mouth of the liquid container after a predetermined amount of liquid is discharged from the liquid container.

In the disclosed liquid container manufacturing method configured in the above described manner, it is preferable that the liquid discharge step is performed by sucking back a predetermined amount of liquid from the liquid container after molding through the blow nozzle.

Advantageous Effect

According to the present disclosure, a liquid container manufacturing method in which a liquid container having a predetermined content volume and a shape can be manufactured precisely and at a low cost can be provided.

DETAILED DESCRIPTION

The present disclosure will be described in more detail below with reference to the drawings.

A liquid container manufacturing method according to an embodiment of the present disclosure is a liquid container manufacturing method in which a liquid container that contains a content liquid is manufactured from a synthetic resin preform, the method including: an inflation body insertion step of inserting an inflation body into the preform placed in a mold for blow molding; an air discharge step of discharging the air out of the preform by inflating the inflation body in the preform; a mouth blocking step of blocking a mouth of the preform with the inflation body inflated in the preform; an inflation body contraction step of contracting the inflation body with the mouth blocked; and a liquid blow molding step of molding the preform into a liquid container having a shape conforming to an inner surface of the mold for blow molding by supplying a pressurized liquid into the preform through a blow nozzle.

The liquid container manufacturing method according to this embodiment further includes a rod stretching step of axially stretching the preform by a stretching rod before or during the liquid blow molding step, in which the inflation body is provided to the stretching rod.

Further, the liquid container manufacturing method according to this embodiment further includes a rod withdrawing step of separating the stretching rod from the liquid container after the liquid blow molding step.

Moreover, the liquid container manufacturing method according to this embodiment further includes, after the liquid blow molding step, a liquid discharge step of discharging a predetermined amount of liquid from the liquid container after molding through the blow nozzle and a headspace forming step of generating a predetermined amount of headspace in the liquid container by separating the blow nozzle from the mouth of the liquid container after a predetermined amount of liquid is discharged from the liquid container.

In the liquid container manufacturing method according to this embodiment, the liquid discharge step is performed by sucking back a predetermined amount of liquid from the liquid container after molding through the blow nozzle.

Figure 1:
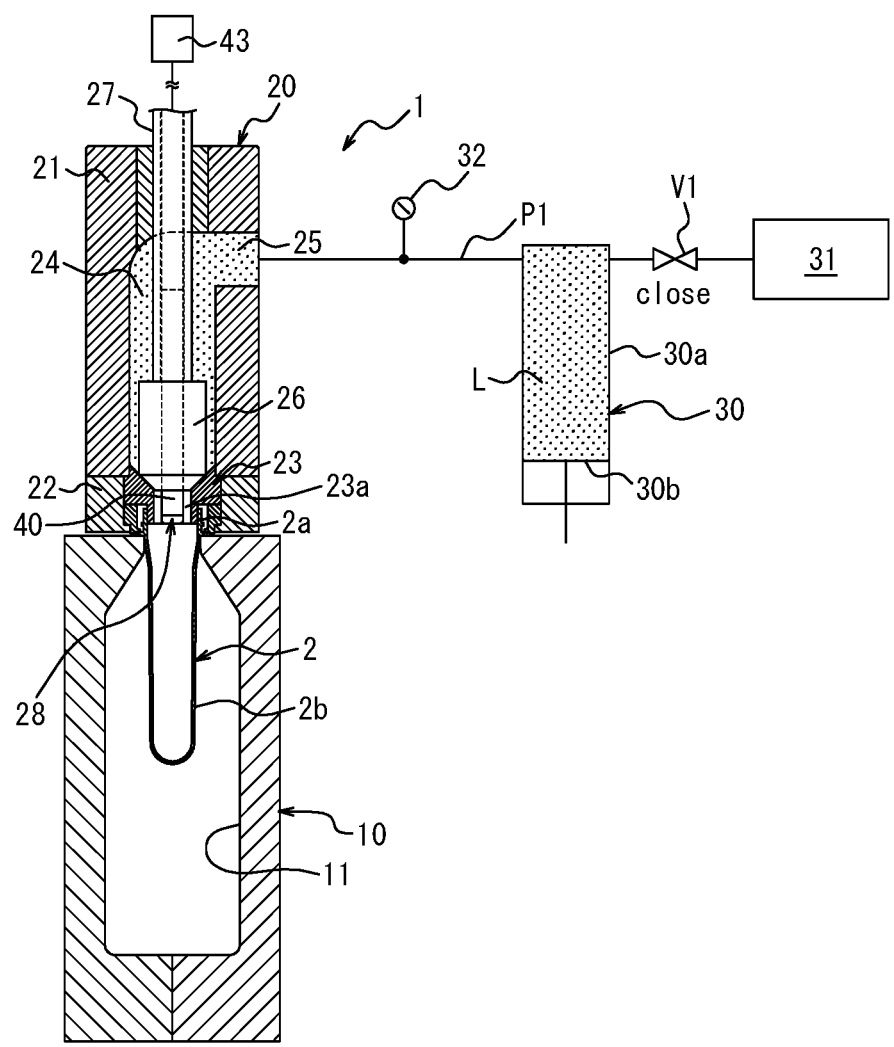
FIG. 1 illustrates an example of a liquid container manufacturing apparatus used for a liquid blow molding method according to an embodiment of the present disclosure.
Figure 2:
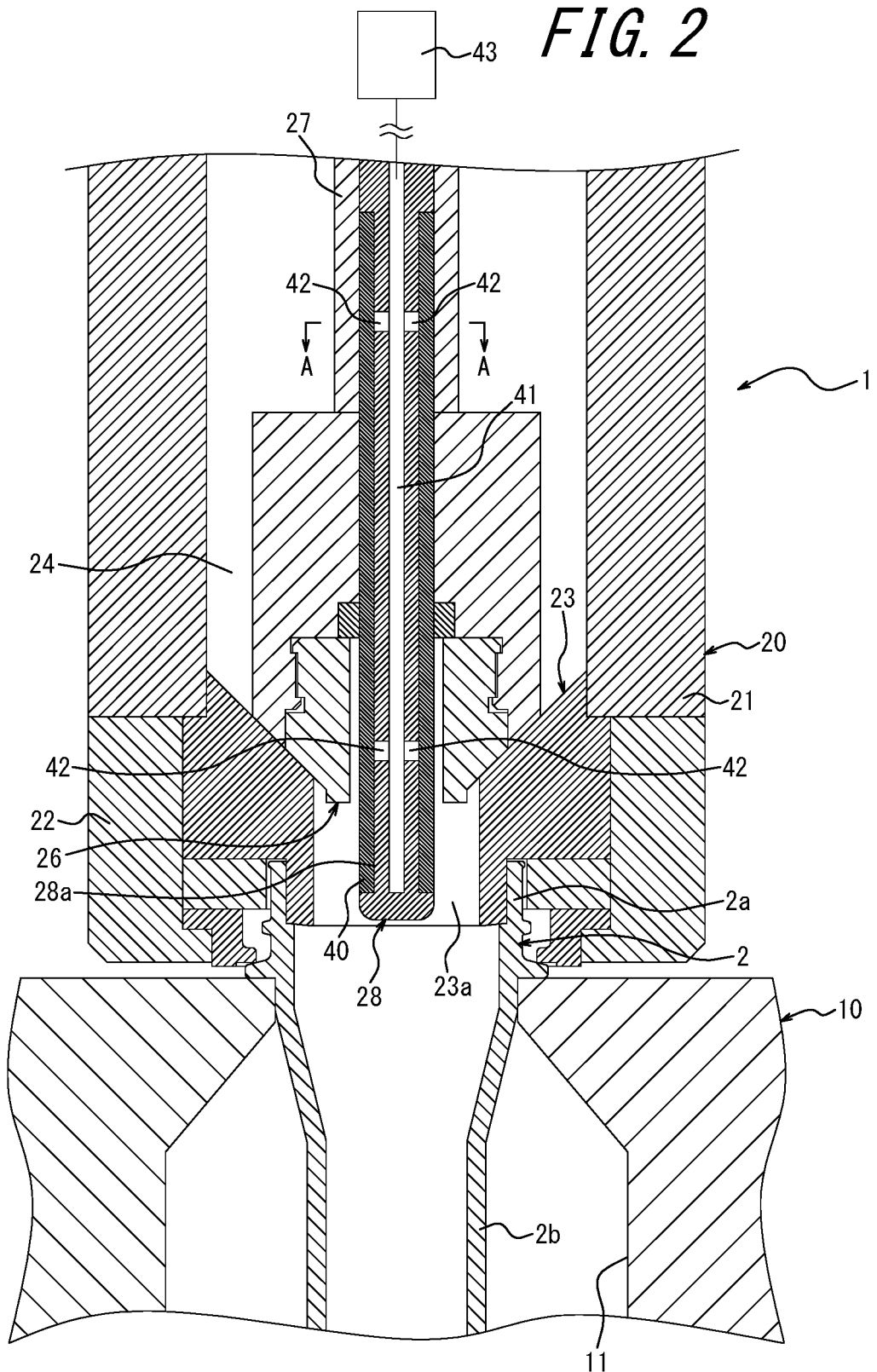
FIG. 2 is an enlarged cross-sectional view illustrating a detailed configuration of a main part of a nozzle unit in FIG. 1.
Figure 3:
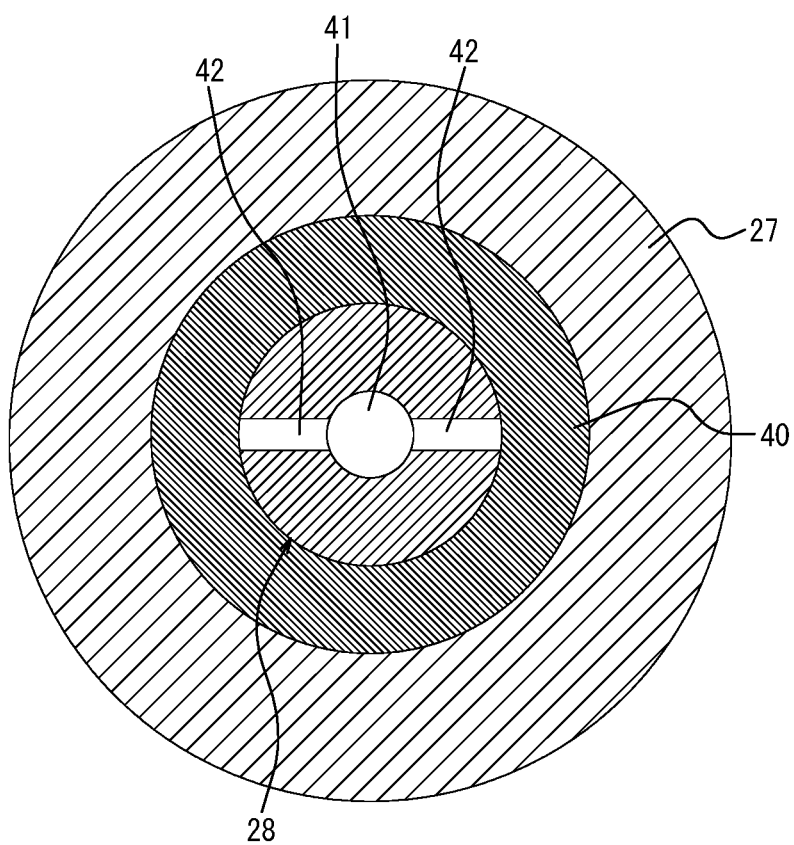
FIG. 3 is a cross-sectional view along line A-A in FIG. 2.

The liquid container manufacturing method according to the embodiment described above can be performed by using a liquid container manufacturing apparatus 1 configured as illustrated in FIGS. 1 to 3, for example.

The liquid container manufacturing apparatus 1 illustrated in FIG. 1 is used to manufacture a liquid container C that contains a content liquid from a synthetic resin preform 2. As the liquid (content liquid) L contained in a liquid container C, a variety of liquids L such as, for example, beverages and toiletries including cosmetic products, pharmaceutical products, detergents and shampoo can be adopted.

As the preform 2, those formed into a bottomed tubular shape that includes a cylindrical mouth 2a, which is an open end, and a cylindrical body 2b continuing to the mouth 2a and having a blocked lower end from a thermoplastic synthetic resin material such as polypropylene (PP) and polyethylene terephthalate (PET), for example, can be used.

Although not illustrated in detail, on the outer wall surface of the mouth 2a is provided with a fitting protrusion configured to mount a plug cap (not illustrated) to the mouth 2a of the liquid container C after molding by plugging (undercut fitting). It is to be noted that, instead of the fitting protrusion, a male thread may be provided to the outer wall surface of the mouth 2a so as to mount the plug cap to the mouth 2a through thread connection.

The liquid container manufacturing apparatus 1 has a mold for blow molding 10. The mold for blow molding 10 has a cavity 11 having a shape corresponding to a final shape of the liquid container C, such as a bottle shape, for example. The cavity 11 opens upward on the upper surface of the mold for blow molding 10. The preform 2 is placed in the mold for blow molding 10 with the body 2b disposed in the cavity 11 of the mold for blow molding 10 and with the mouth 2a protruded upward from the mold for blow molding 10.

The mold for blow molding 10 can be opened right and left, and after the preform 2 is molded into a liquid container C, the liquid container C can be ejected from the mold for blow molding 10 by opening the mold for blow molding 10 right and left.

Above the mold for blow molding 10 is provided with a nozzle unit 20 configured to supply a pressurized liquid L into the preform 2. The nozzle unit 20 has a main body block 21, and the main body block 21 is vertically displaceable relative to the mold for blow molding 10.

As illustrated in FIG. 2, the lower end of the main body block 21 is provided with a support block 22, and a blow nozzle 23 is mounted to the lower end of the main body block 21 by being supported by the support block 22. The blow nozzle 23 is formed into a substantially cylindrical shape, and a liquid supply port 23a is provided therein. When the main body block 21 is lowered to the stroke end on the lower side, the blow nozzle 23 is fitted, in a sealed manner, over the mouth 2a of the preform 2 placed in the mold for blow molding 10.

Inside the main body block 21 is provided with a supply path 24 that extends in the vertical direction. The supply path 24 is a flow path configured to supply a liquid L to the liquid supply port 23a of the blow nozzle 23, and communicates with the liquid supply port 23a of the blow nozzle 23 at the lower end thereof.

Furthermore, as illustrated in FIG. 1, the main body block 21 is provided with a supply port 25 that communicates with the upper end of the supply path 24.

Inside the supply path 24 is provided with a seal body 26 configured to open/close the liquid supply port 23a of the blow nozzle 23. The seal body 26 is fixed to an axial body 27 provided vertically displaceable relative to the nozzle unit 20, and is vertically displaceable in the supply path 24. The seal body 26 may be formed integrally with the axial body 27.

The seal body 26 is formed into a cylindrical shape, and comes in contact with the upper surface of the blow nozzle 23 on the lower end surface when it is displaced to the closed position, which is a stroke end position on the lower side, and blocks the liquid supply port 23a of the blow nozzle 23 such that the blow nozzle 23 is in a closed state. It is to be noted that, when the blow nozzle 23 that is fitted, in a sealed manner, over the mouth 2a of the preform 2 placed in the mold for blow molding 10 is closed by the seal body 26, the mouth 2a of the preform 2 is blocked by the blow nozzle 23.

On the other hand, when the seal body 26 is displaced upward from the closed position, the liquid supply port 23a of the blow nozzle 23 is opened and the blow nozzle 23 is in an open state where the liquid supply port 23a is communicated with the supply path 24.

As illustrated, the liquid container manufacturing apparatus 1 may include a stretching rod 28. The stretching rod 28 formed from steel and the like into a rod shape is inserted into an axial center of the axial body 27 so as to be vertically displaceable relative to the axial body 27, passes through the axial center of the seal body 26 and is extendable/retractable from the lower end of the seal body 26. The stretching rod 28 is driven by a driving source not illustrated and is displaced downward, which allows the preform 2 to be axially stretched.

A pressurized liquid supply source 30 is connected to the supply port 25 through a pipe P1. The pressurized liquid supply source 30 can be configured as a plunger pump that includes a cylinder 30a and a piston (plunger) 30b, for example.

A supply tank 31 is connected to the pressurized liquid supply source 30. The supply tank 31 may be configured to store the liquid L, heat the liquid L up to a predetermined temperature and hold the liquid L at the temperature. A flow path between the pressurized liquid supply source 30 and the supply tank 31 is provided with an opening-closing valve V1, and the flow path can be opened/closed by the opening-closing valve V1. It is to be noted that the reference sign 32 represents a pressure gauge provided to the pipe P1.

The pressurized liquid supply source 30 is operated in a positive direction (a pressurized direction) with the blow nozzle 23 fitted, in a sealed manner, over the mouth 2a of the preform 2 placed in the mold for blow molding 10, and with the seal body 26 displaced upward to allow the liquid supply port 23a to be in an open state. In this manner, the pressurized liquid supply source 30 can supply a liquid L pressurized up to a predetermined pressure into the preform 2 through the pipe P1, the supply port 25, the supply path 24 and the liquid supply port 23a of the blow nozzle 23.

Further, the pressurized liquid supply source 30 is operated in a reverse direction with the liquid supply port 23a closed by the seal body 26 and the opening-closing valve V1 open. In this manner, the liquid L stored in the supply tank 31 is sucked into the cylinder 30a to prepare for the next liquid blow molding.

Moreover, the pressurized liquid supply source 30 is operated in a reverse direction (sucking direction) with the liquid supply port 23a opened by the seal body 26 and the opening-closing valve V1 closed. In this manner, the liquid L stored in the liquid container C after molding can be sucked back into the supply path 24 and discharged out of the liquid container C.

The liquid container manufacturing apparatus 1 has an inflation body 40 so as to discharge the air out of the preform 2 in the air discharge step before the liquid blow molding is performed. As illustrated in FIGS. 2 and 3, in this embodiment, the inflation body 40 is provided to the stretching rod 28.

The inflation body 40 is made of a synthetic rubber and formed into a cylindrical shape. The inflation body 40 is mounted to an annular mounting groove 28a provided on the outer periphery on the lower end side of the stretching rod 28. The axial length of the inflation body 40 is substantially the same as that of the mounting groove 28a, and is slightly shorter than that of the preform 2. When both ends of the inflation body 40 in the axial direction elastically come in contact with the both side surfaces of the mounting groove 28a in the axial direction, an airtight seal is obtained between both ends of the inflation body 40 in the axial direction and the both side surfaces of the mounting groove 28a in the axial direction.

The outer diameter of the inflation body 40 is slightly smaller than that of the stretching rod 28 so as not to allow the outer periphery of the inflation body 40 to come in contact with the inner surface of the seal body 26 or the inner surface of the axial body 27 in a sliding manner when the stretching rod 28 is displaced vertically. In this manner the stretching rod to which the inflation body 40 is mounted can be operated smoothly.

It is to be noted that the inflation body 40 may be made of not only synthetic rubber, but also made of other materials as far as the material has a stretchability (elasticity) and is not permeable to the air or other fluids to be introduced into the inflation body 40.

Both ends of the inflation body 40 in the axial direction can be blocked more reliably in an airtight manner by tightening, from the outer periphery of the inflation body 40, both ends of the inflation body 40 in the longitudinal direction to the stretching rod 28 with a member such as a fastening band, by fixing, in an airtight manner, the both ends of the inflation body 40 in the longitudinal direction to the stretching rod 28 with adhesives and the like, or by forming the upper and lower end surfaces of the mounting groove 28a into a recessed groove and fitting the upper and lower ends of the inflation body 40 into the groove.

A pressurized air supply path 41 is provided to the stretching rod 28. The pressurized air supply path 41 extends along the axial center of the stretching rod 28. The lower end of the pressurized air supply path 41 is closed without being opened to the lower end of the stretching rod 28. A plurality of radially extending branch paths 42 are provided continuous from the pressurized air supply path 41, and the pressurized air supply path 41 is communicated with the mounting groove 28a through these branch paths 42. In this embodiment, a pair of branch paths 42 are provided at two portions, that is, the upper portion and the lower portion of the stretching rod 28, respectively. The number and the installation location of the branch path 42 may be changed in any manner.

A pressurized air supply source 43 is connected to the pressurized air supply path 41. When pressurized air at a predetermined pressure is supplied from the pressurized air supply source 43 to the pressurized air supply path 41, the pressurized air is supplied between the mounting groove 28a and the inflation body 40 through the branch path 42, which allows the inflation body 40 to inflate such that the outer diameter thereof is enlarged.

Operation of the nozzle unit 20, the seal body 26, the stretching rod 28, the pressurized liquid supply source 30, the opening-closing valve V1 and the pressurized air supply source 43 and the like are controlled by a controller (not illustrated) in an integrated manner. This control can be performed with reference to the values of the pressure gauge 32. It is preferable that the opening-closing valve V1 is configured as a solenoid valve that can be controlled by the controller.

Next, a method of molding, from a synthetic resin preform 2, a liquid container C that contains a liquid (content liquid) L in a container having a predetermined shape by using the liquid container manufacturing apparatus 1 configured in the above described manner (a liquid container manufacturing method according to this embodiment) will be described.

Figure 4:
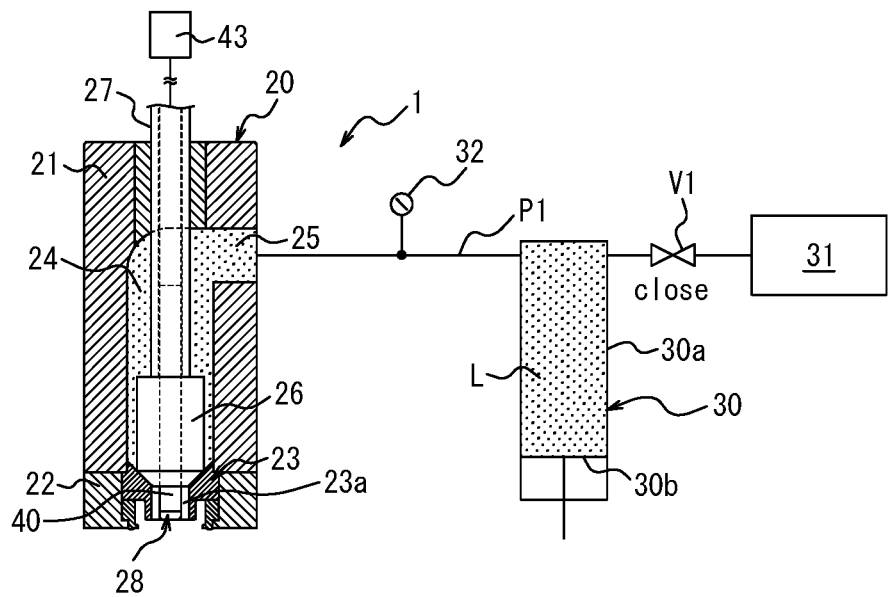
FIG. 4 is a diagram illustrating a liquid container manufacturing apparatus in which a preform is placed in a mold for blow molding.
Figure 4:
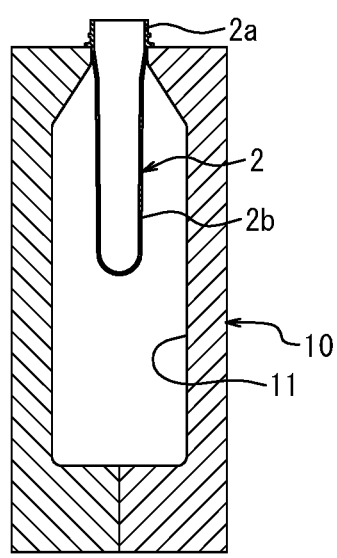

First, as illustrated in FIG. 4, the preform 2 is placed in the mold for blow molding 10 and is clamped, the preform 2 being preheated to a predetermined temperature (e.g. from 80° C. to 150° C.) at which stretchability is achieved by using a heating means (not illustrated) such as a heater.

At this time, the nozzle unit 20 is separated upward from the mold for blow molding 10. The liquid supply port 23*a* is closed by the seal body 26, and the blow nozzle 23 is in a closed state. Further, the mouth 2*a* of the preform 2 is open, thus the preform 2 is filled with the air.

Figure 5:
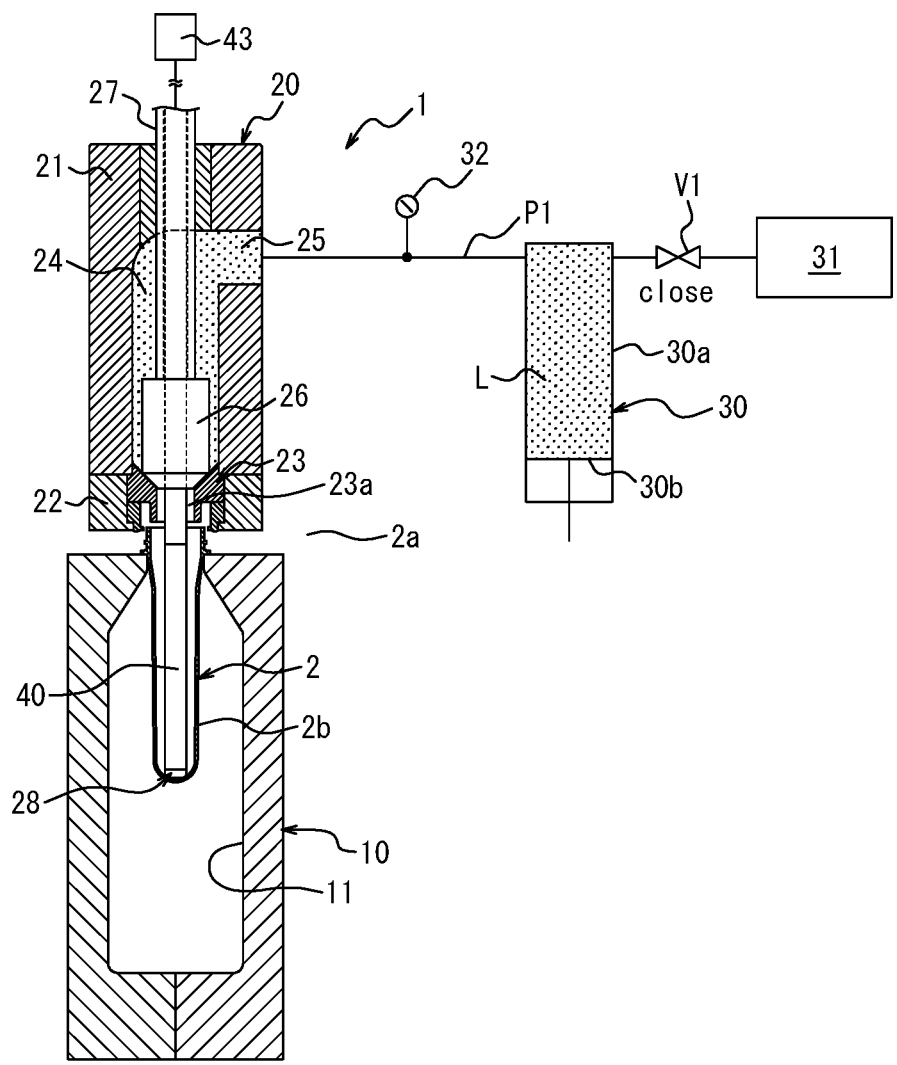
FIG. 5 is a diagram illustrating the liquid container manufacturing apparatus during an inflation body insertion step.

Next, the process proceeds to the inflation body insertion step. In the inflation body insertion step, as illustrated in FIG. 5, the nozzle unit 20 is lowered to a position immediately before the blow nozzle 23 is fitted into the mouth 2*a* of the preform 2. In this state the stretching rod 28 is extended downward such that the inflation body 40 is inserted, through the mouth 2*a*, into the preform 2 placed in the mold for blow molding 10. At this time, the stretching rod 28 is lowered to a position where the lower end thereof comes in contact with or comes close to the inner surface of the bottom of the preform 2, and the inflation body 40 is entirely inserted into the preform 2.

Figure 6:
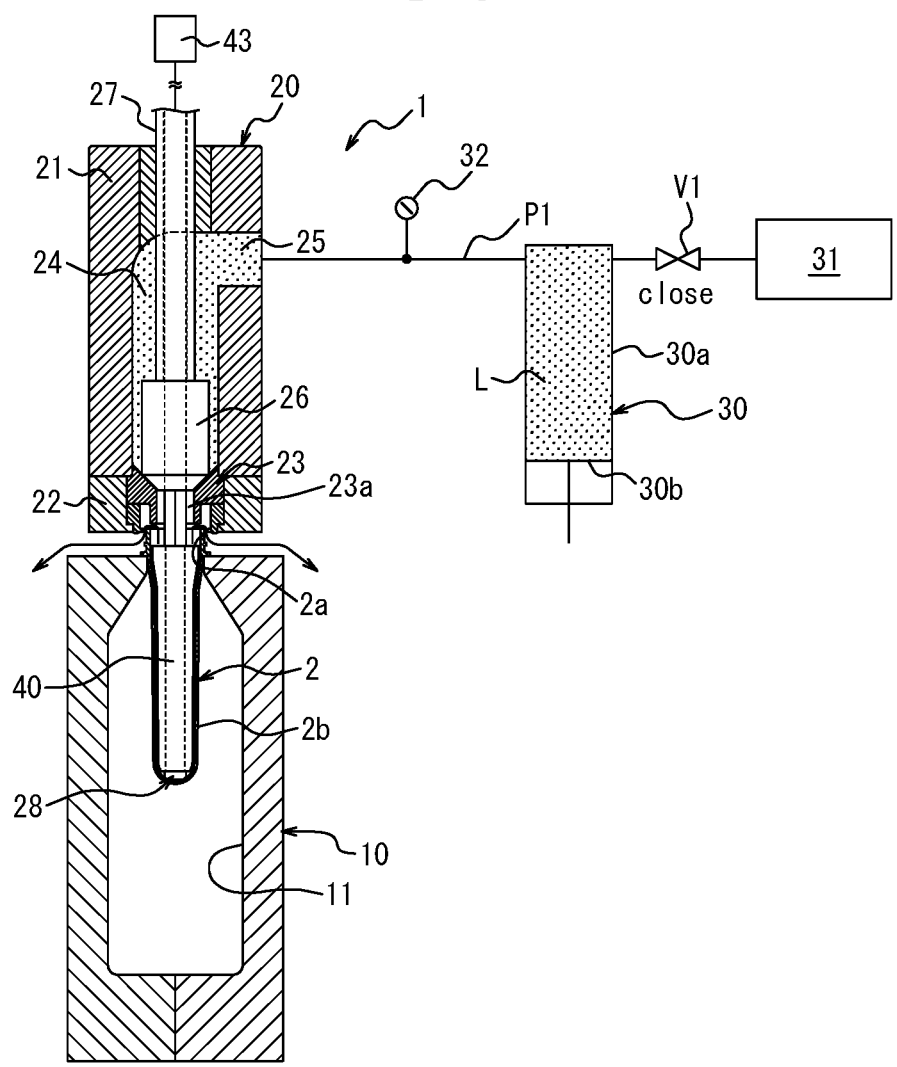
FIG. 6 is a diagram illustrating the liquid container manufacturing apparatus during an air discharge step.

When the inflation body insertion step is finished, the process proceeds to the air discharge step. In the air discharge step, as illustrated in FIG. 6, the pressurized air supply source 43 is operated to inflate the inflation body 40 in the preform 2 such that the air is discharged out of the preform 2 through the mouth 2*a*. That is, most of the air filled in the preform 2 is pushed out and discharged by the inflation body 40 by inflating the inflation body 40 in the preform 2. It is to be noted that, in the air discharge step, hot air heated to a predetermined temperature may be used as pressurized air to be supplied from the pressurized air supply source 43 into the inflation body 40 so as to prevent the temperature of the preform 2 from being decreased.

Figure 7:
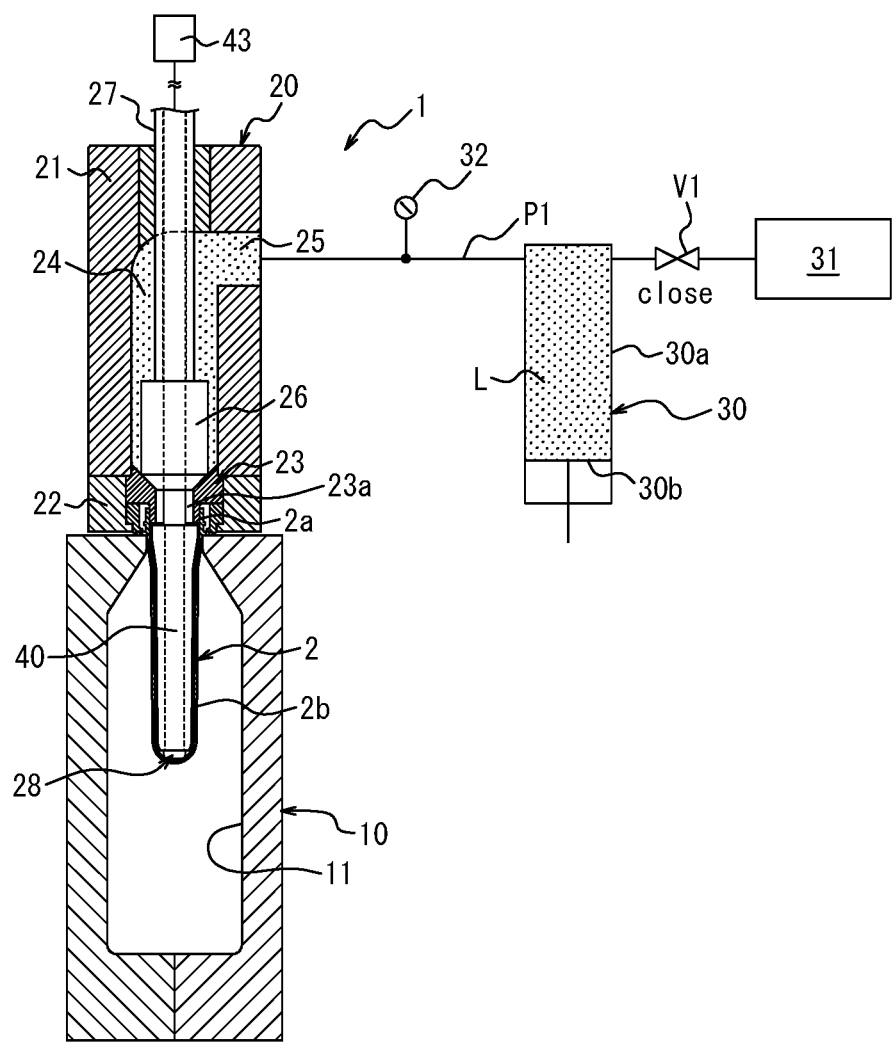
FIG. 7 is a diagram illustrating the liquid container manufacturing apparatus during a mouth blocking step.

When the air discharge step is finished, the process proceeds to the mouth blocking step. In the mouth blocking step, as illustrated in FIG. 7, the nozzle unit 20 is lowered with the inflation body 40 inflated in the preform 2 such that the blow nozzle 23 is fitted into the mouth 2*a* of the preform 2, the blow nozzle 23 being in a closed state in which the liquid supply port 23*a* is closed by the seal body 26. When the blow nozzle 23 in a closed state is fitted in, the mouth 2*a* of the preform 2 is blocked in an airtight manner.

Figure 8:
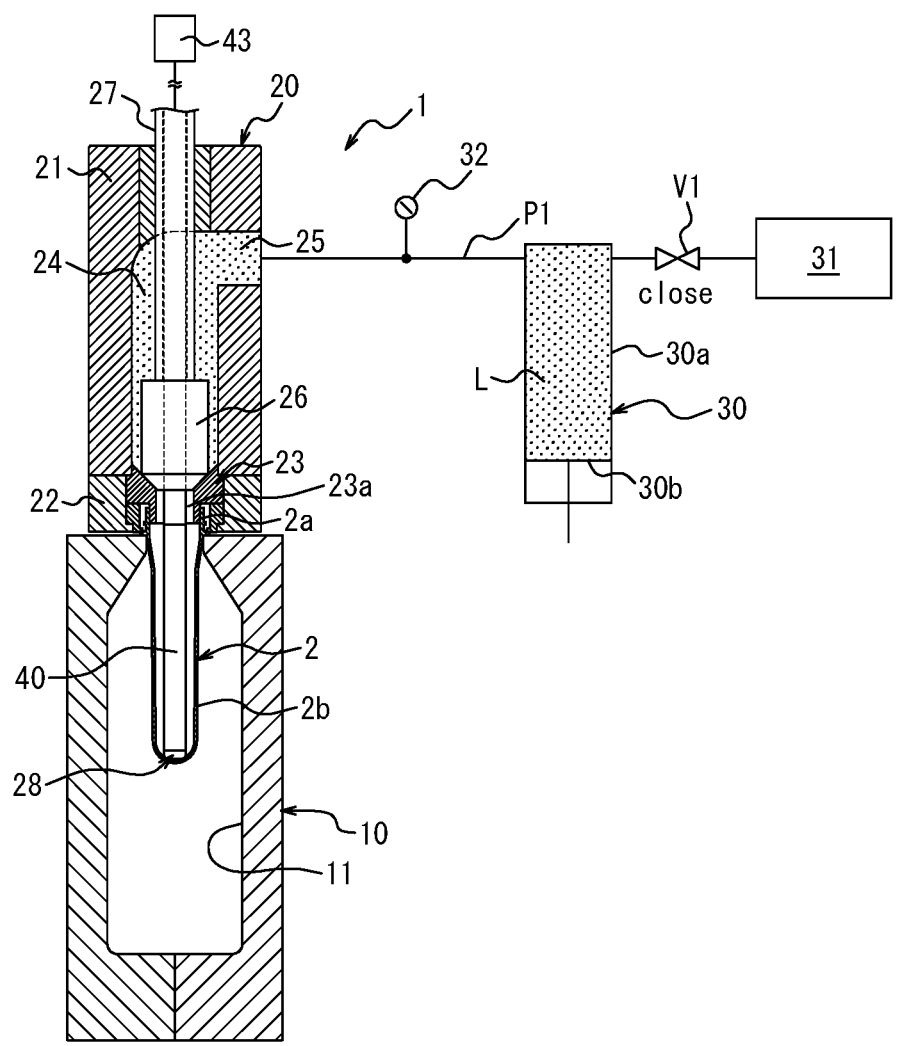
FIG. 8 is a diagram illustrating the liquid container manufacturing apparatus during an inflation body contraction step.

When the mouth blocking step is finished, the process proceeds to the inflation body contraction step. In the inflation body contraction step, as illustrated in FIG. 8, operation of the pressurized air supply source 43 is stopped with the mouth 2*a* of the preform 2 blocked by the blow nozzle 23 which is in a closed state to contract the inflation body 40 to its original shape. Contraction of the inflation body 40 into its original shape causes a negative pressure in the preform 2. However, since the mouth 2*a* of the preform 2 is blocked in an airtight manner by the blow nozzle 23 which is in a closed state, no outside air is introduced into the preform 2.

It is to be noted that, in this embodiment, although the inflation body 40 is contracted to its original shape by its elastic restoration force when operation of the pressurized air supply source 43 is stopped, the inflation body 40 may be contracted to its original shape by supplying a negative pressure to the pressurized air supply path 41.

Figure 9:
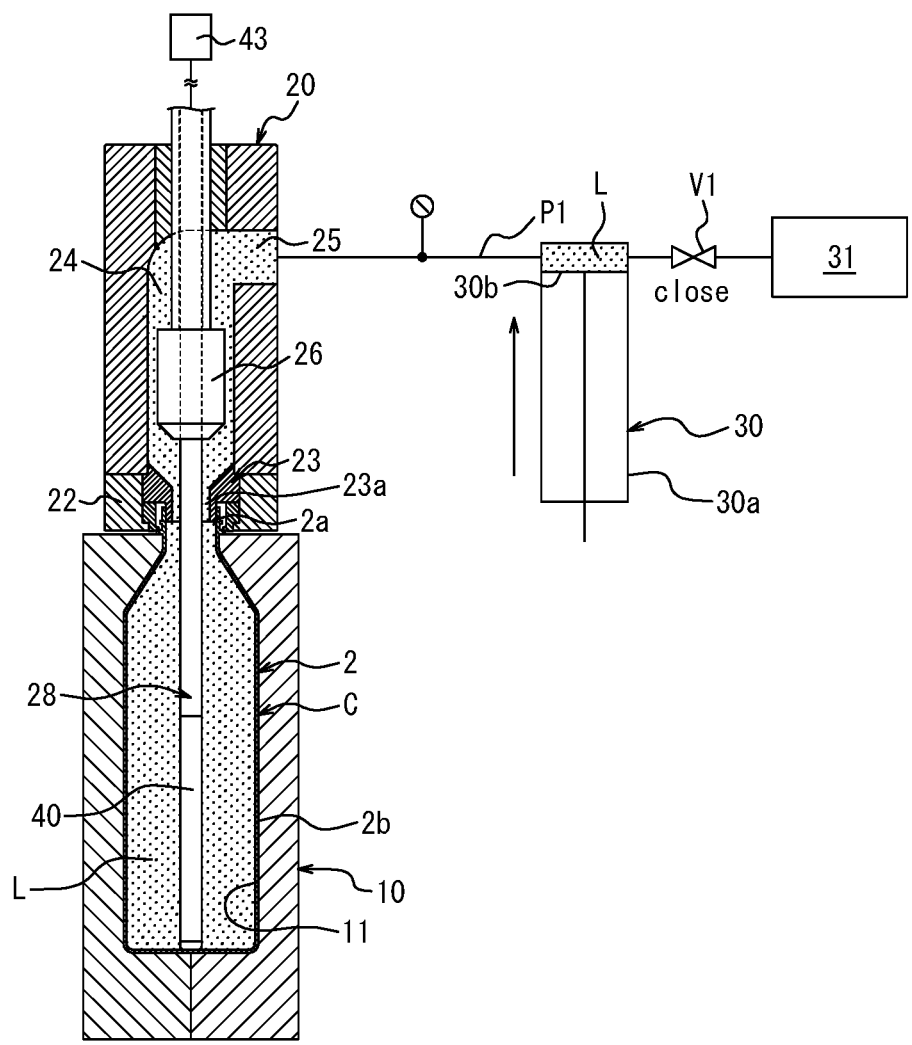
FIG. 9 is a diagram illustrating the liquid container manufacturing apparatus during a rod stretching step and a liquid blow molding step.

When the inflation body contraction step is finished, the process proceeds to the liquid blow molding step. In the liquid blow molding step, as illustrated in FIG. 9, the seal body 26 is raised to open the liquid supply port 23*a* to allow the blow nozzle 23 to be in an open state, and in this state the pressurized liquid supply source 30 is operated in a positive direction to supply a liquid L pressurized to a predetermined pressure into the preform 2 through the blow nozzle 23. In this manner, a pressurized liquid L is supplied into the preform 2 to allow, by the pressure of the liquid L, the preform 2 to be molded into a liquid container C having a predetermined shape conforming to an inner surface of the cavity 11 of the mold for blow molding 10.

In this context, the liquid blow molding step is performed after most of the air is discharged out of the preform 2 in the air discharge step. Thus, when a pressurized liquid L is supplied into the preform 2, the liquid L may not catch the air. In this manner mixing of the air into the liquid L in the liquid container C is prevented.

As with this embodiment, the rod stretching step may be performed during the liquid blow molding step. In the rod stretching step, as illustrated in FIG. 9, the stretching rod 28 is extended downward so as to stretch the body 2*b* of the preform 2 thereby in the axial direction (longitudinal direction). It is to be noted that the rod stretching step may be followed by the liquid blow molding step. When the liquid blow molding step is performed after or during the rod stretching step (the rod stretching step may be started after the liquid blow molding step is started), a biaxial stretch blow molding in which a liquid blow molding is performed while the preform 2 is axially stretched by the stretching rod 28 can be performed. In this manner the preform 2 can be molded into a liquid container C having a predetermined shape more precisely.

Figure 10:
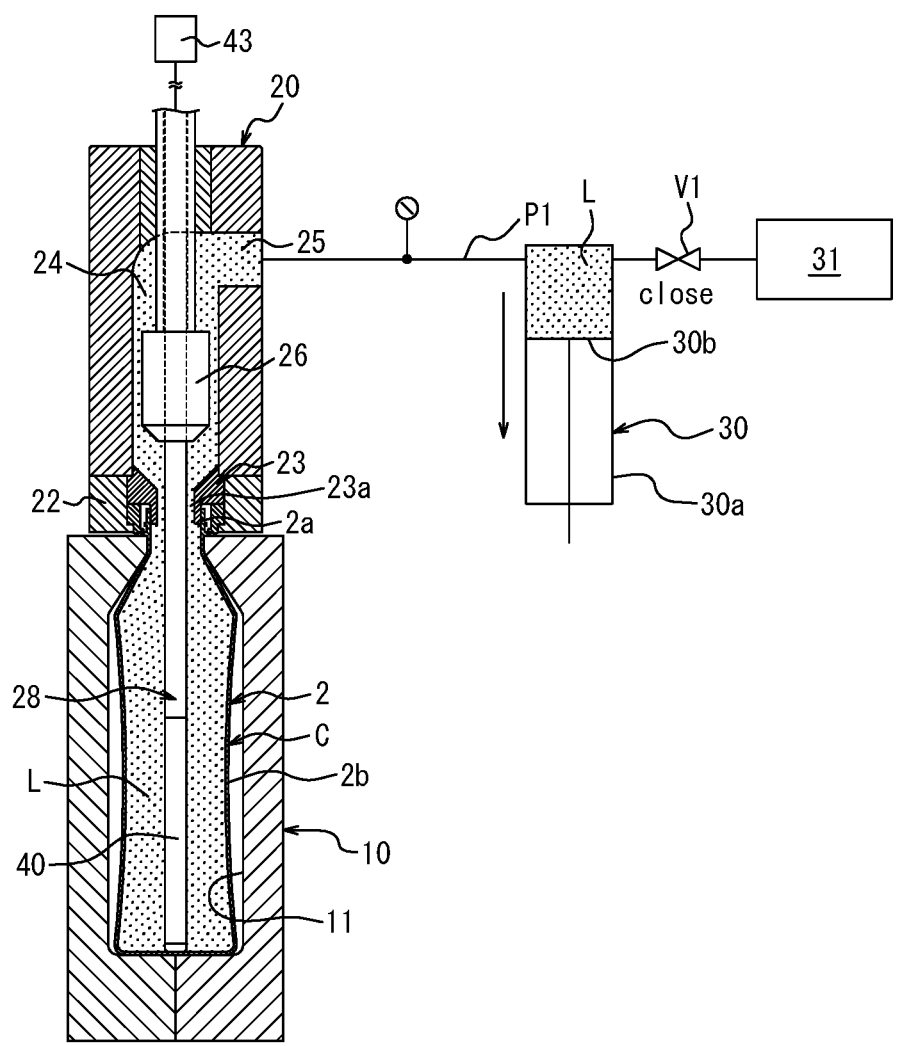
FIG. 10 is a diagram illustrating the liquid container manufacturing apparatus during a liquid discharge step.

As with this embodiment, the liquid blow molding step in which a liquid container C is molded may be followed by the liquid discharge step. In the liquid discharge step, as illustrated in FIG. 10, the seal body 26 is raised to open the liquid supply port 23*a*, and in this state the pressurized liquid supply source 30 is operated by a predetermined operating amount in the reverse direction (sucking direction) to suck back a predetermined amount of liquid from the liquid container C after molding into the supply path 24. After that the seal body 26 is lowered to block the liquid supply port 23*a*. With the above described sucking back, a predetermined amount of liquid L can be discharged out of the liquid container C after molding.

In this context, according to this embodiment, the liquid blow molding is performed after discharging most of the air out of the preform 2 in the air discharge step. In this manner mixing of the air into the liquid L in the liquid container C is prevented. Thus, even if the liquid L is sucked back from the liquid container C into the supply path 24, deterioration of moldability or the like does not occur in the following liquid blow molding step. The amount of the liquid L to be discharged out of the liquid container C in the liquid discharge step is set in consideration of a headspace HS provided in a finished liquid container C.

When a predetermined amount of liquid L is discharged, the body of the liquid container C is dented.

It is to be noted that, in the liquid discharge step, in addition to the above described sucking back, the liquid L in the liquid container C can be discharged to the outside by squeezing the body of the liquid container C such that it is dented, by using a pressing member, for example, that protrudes from the inner surface of the mold for blow molding 10.

Figure 11:
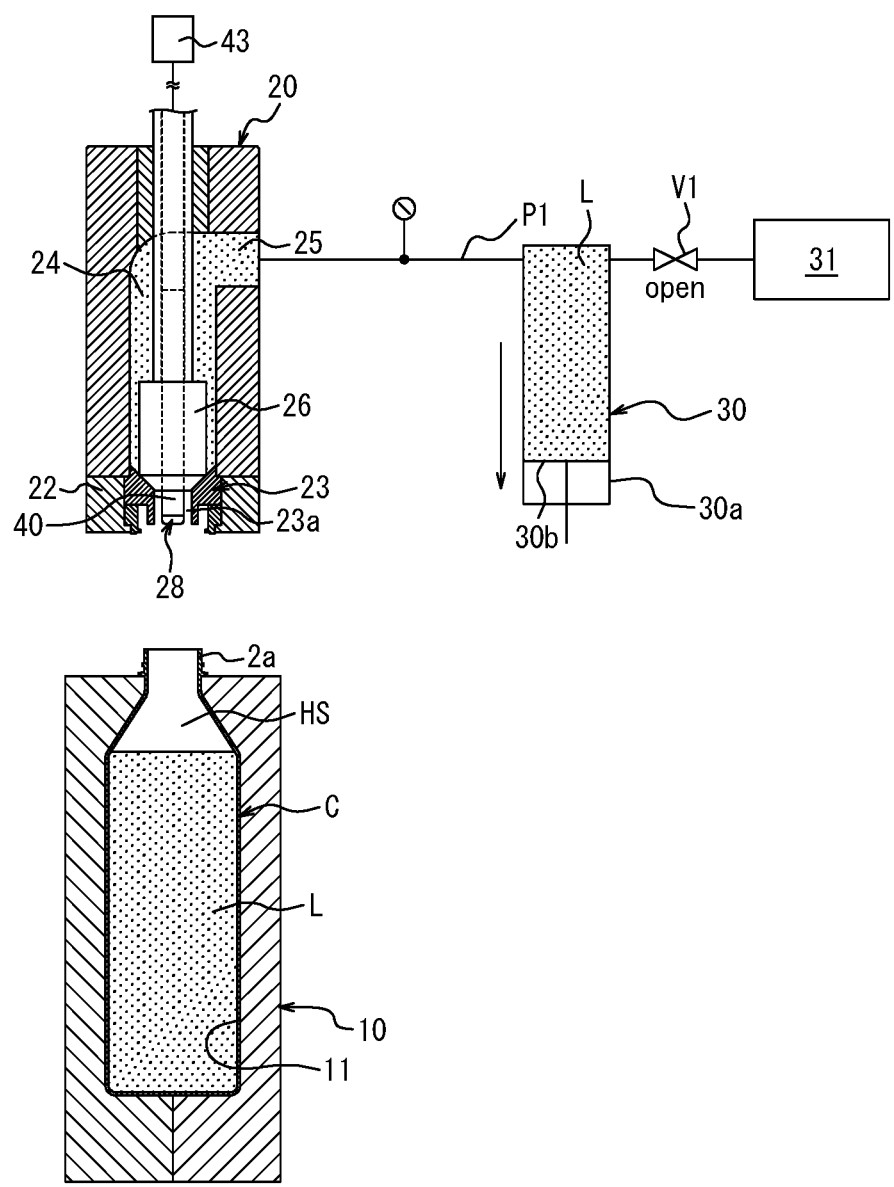
FIG. 11 is a diagram illustrating the liquid container manufacturing apparatus during a headspace forming step after the rod withdrawing step.

As with this embodiment, after the liquid discharge step is finished, the rod withdrawing step in which the stretching rod 28 is displaced upward to be separated from the liquid container C and the headspace forming step may be performed. As illustrated in FIG. 11, in the rod withdrawing step, after the liquid supply port 23a is blocked by the seal body 26 to allow the blow nozzle 23 to be in a closed state, the stretching rod 28 is retracted upward so that it is separated from the liquid container C. In the headspace forming step, the liquid supply port 23a is blocked by the seal body 26 to allow the blow nozzle 23 to be in a closed state, and the nozzle unit 20 is displaced upward relative to the mold for blow molding 10 after the rod withdrawing step is finished. Thus the blow nozzle 23 in a closed state is separated from the mouth 2a of the liquid container C after a predetermined amount of liquid L is discharged from the liquid container C. In this manner, a negative pressure in the liquid container C is released, and a predetermined amount of headspace HS is generated in the liquid container C.

It is to be noted that, in the rod withdrawing step, when the stretching rod 28 is withdrawn and separated from the liquid container C, a headspace HS in the liquid container C is increased by the volume of the stretching rod 28 withdrawn. Therefore, when the rod stretching step and the rod withdrawing step are performed, an amount of the liquid L to be discharged out of the liquid container C in the liquid discharge step is set in consideration of an amount of the headspace HS generated by separating the stretching rod 28. In this manner, a desired volume of headspace HS is generated in a finished liquid container C.

It is to be noted that, when the liquid discharge step is not performed, in order to provide a headspace HS, only the rod withdrawing step may be performed after a liquid container C is molded by the liquid blow molding step. In this case, in the rod withdrawing step, after the liquid supply port 23a is blocked by the seal body 26 to allow the blow nozzle 23 to be in a closed state, the stretching rod 28 is displaced upward to be separated from the liquid container C. Further, after the rod withdrawing step, the headspace forming step in which the nozzle unit 20 is displaced upward relative to the mold for blow molding 10 is performed with the blow nozzle 23 kept in a closed state. In this manner, a headspace HS corresponding to the volume of the space to which the stretching rod 28 has been inserted is generated in the liquid container C. Moreover, after the rod withdrawing step is performed with the liquid supply port 23a open (a state where a liquid is supplied), the liquid discharge step, blocking of the liquid supply port 23a and lifting of the nozzle unit 20 may be performed in this order. Alternatively, a headspace may be formed only by the liquid discharge step, without providing the rod withdrawing step. It is to be noted that, when it is not necessary to provide a headspace HS in the liquid container C, the stretching rod 28 may be separated from the liquid container C by being displaced upward with the blow nozzle 23 open, without performing the liquid discharge step.

A finished liquid container C is ejected from the mold for blow molding 10 by opening the mold, and a plug cap is fitted to the mouth 2a thereof. In this manner a liquid container C is provided as a product. In this context, the pressurized liquid supply source 30 is operated in the reverse direction with the opening-closing valve V1 open, and the liquid L stored in the supply tank 31 is sucked into the cylinder 30a. It is to be noted that a liquid container C may be ejected from the mold for blow molding 10 by opening the mold after a plug cap is fitted to the mouth 2a thereof.

In this embodiment, after a liquid container C is molded by the liquid blow molding step, the liquid discharge step, the rod withdrawing step and the headspace forming step are performed, and after that the mold for blow molding 10 is opened to eject a finished liquid container C therefrom. However, in the case where a headspace HS is not needed to be provided in a liquid container C, the liquid blow molding step may not be followed by the liquid discharge step, the rod withdrawing step and the headspace forming step. In this manner a liquid container C after molding may be ejected after the liquid blow molding step, and manufacturing of a liquid container C is finished.

As described above, in the liquid container manufacturing method according to this embodiment, the liquid blow molding step is performed after the air is discharged out of the preform 2 in the air discharge step. In this manner, when a pressurized liquid L is supplied into the preform 2 in the liquid blow molding step, mixing of the air into the liquid L can be suppressed. Therefore, a decline in the stability of molding conditions and moldability of a container due to bubbling of the liquid L or the like can be prevented during liquid blow molding, and thus a liquid container C having a predetermined capacity and a shape can be manufactured precisely and at a low cost.

Further, in the liquid container manufacturing method according to this embodiment, the inflation body 40 for the air discharge step is provided to the stretching rod 28. In this manner, the configuration for performing the air discharge step is simplified, and its cost can be reduced.

Moreover, in the liquid container manufacturing method according to this embodiment, the liquid blow molding step is performed after the air is discharged out of the preform 2 in the air discharge step so as to prevent the air from entering into the liquid container C. Thus, the liquid discharge step is performed after the liquid blow molding step, and even if a predetermined amount of headspace HS is provided in a liquid container C after molding, a headspace HS can be generated in the liquid container C without generating bubbles in the liquid L in the supply path 24 of the nozzle unit 20. In this manner, a liquid container C having a predetermined capacity and a shape can be manufactured precisely and at a low cost without causing problems such as a lack of liquid L to be filled into a liquid container C due to a liquid L that contains a lot of bubbles that are taken into the supply path 24 and a decline in moldability of a container due to an unstable filling pressure during a liquid blow molding, or without creating a useless step to discharge a liquid L containing bubbles out of the supply path 24.

Moreover, in the liquid container manufacturing method according to this embodiment, the liquid discharge step is performed by sucking back a predetermined amount of liquid L from a liquid container C by operating the pressurized liquid supply source 30 in the reverse direction. Thus the liquid discharge step can be performed without separately providing a mechanism for discharging a liquid L. In this manner, the configuration of the liquid container manufacturing apparatus 1 is simplified and the manufacturing cost of a liquid container C can be reduced.

Needless to say, the present disclosure is not limited to the above described embodiment, and various changes may be made without departing from the spirit of the present disclosure.

For example, in the above described embodiment, the disclosed liquid container manufacturing method is performed by using the liquid container manufacturing apparatus 1 configured as illustrated in FIG. 1. However, the disclosed liquid container manufacturing method may be performed by using a liquid container manufacturing apparatus having the other configurations.

Further, in the above described embodiment, although the rod stretching step and the rod withdrawing step are performed by using the liquid container manufacturing apparatus 1 provided with the stretching rod 28, these steps may be omitted. In this case, the liquid container manufacturing apparatus 1 having no stretching rod 28 may be used.

Moreover, in the above described embodiment, although the inflation body 40 is provided to the stretching rod 28, this is not restrictive, and the inflation body 40 may be provided to the portions other than the stretching rod 28 as far as the inflation body 40 can be inflated in the preform 2 when it is inserted therein, or other members having the inflation body 40 may be provided.

Furthermore, in the above described embodiment, although the inflation body 40 is inflated by the pressurized air supplied from the pressurized air supply source 43, this is not restrictive, and the inflation body 40 may be inflated by the other fluids such as a pressurized liquid and the like, instead of the pressurized air.

Figure 12:
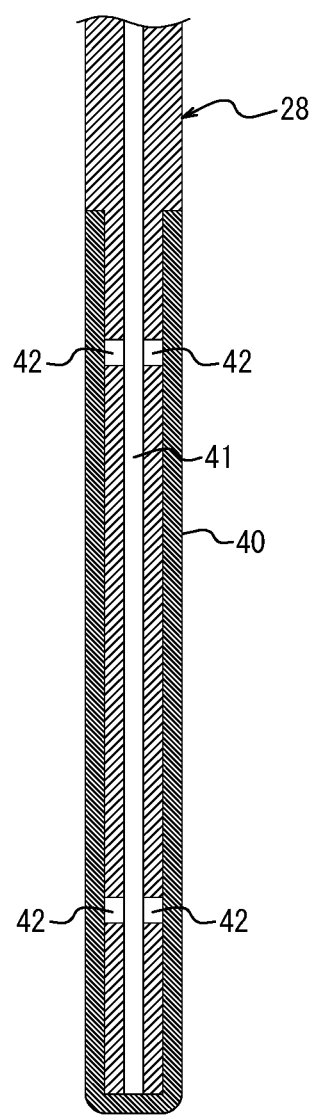
FIG. 12 is a cross-sectional view of a variation of the inflation body illustrated in FIG. 2.

Moreover, in the above described embodiment, the inflation body 40 is formed into a cylindrical shape and is mounted to the stretching rod 28. However, as illustrated in FIG. 12, it may be formed into a bottomed cylindrical shape and mounted to the stretching rod 28 such that the tip thereof is covered by the inflation body 40. In this case, as illustrated, the pressurized air supply path 41 is opened at the lower end of the stretching rod 28 to allow the pressurized air to be supplied to the inflation body 40 from the lower end of the pressurized air supply path 41 in addition to from the branch path 42. However, this is not restrictive, and the pressurized air supply path 41 may be blocked at the lower end of the stretching rod 28 to allow the pressurized air to be supplied to the inflation body 40 only from the branch path 42. Further, the pressurized air may be supplied to the inflation body 40 only from the lower end of the pressurized air supply path 41, without providing the branch path 42. With the above described configuration, in the air discharge step, the inflation body 4 may be inflated also on the bottom side of the preform 2 to allow more air to be discharged out of the preform 2.

Furthermore, in the above described embodiment, although the axial length of the inflation body 4 is slightly shorter than that of the preform 2, this is not restrictive, and in FIG. 5, the inflation body 4 may be formed to have a length such that it is inflatable to fill the entire preform 2 and the interior of the liquid supply port 23a. In this manner, more air can be discharged out of the preform 2 in the air discharge step. In this case, it is preferable that the inflation body 40 has a length such that its upper end is disposed inside the seal body 26 or the axial body 27. Thus, the seal body 26 or the axial body 27 can prevent the upper end of the inflation body 40 from inflating radially, and dropping of the inflation body 40 from the stretching rod 28 can be more reliably prevented.

Moreover, in the above described embodiment, a discharge path for discharging the air out of the preform 2 is secured by not allowing a closed blow nozzle 23 to be fitted into the mouth 2a of the preform 2 in the air discharge step, and the closed blow nozzle 23 is fitted to block the mouth 2a in an airtight manner in the mouth blocking step. However, this is not restrictive, and it is possible that the blow nozzle 23 is provided with an exhaust path separately from the liquid supply port 23a and an opening-closing valve is provided to the exhaust path, for example, and in the air discharge step, the blow nozzle 23 in a closed state in which the liquid supply port 23a is closed by the seal body 16 is fitted into the mouth 2a, and after that the inflation body 40 is inflated with the opening-closing valve of the exhaust path open so as to discharge the air out of the preform 2 through the exhaust path, and in the mouth blocking step, the mouth 2a may be blocked in an airtight manner by closing the opening-closing valve to block the exhaust path.

Furthermore, in the above described embodiment, although the pressurized liquid supply source 30 is a plunger pump, this is not restrictive, and any other types of pump may be used as far as it can pressurize a liquid L to a specific pressure and supply the liquid L to the preform 2.

Moreover, a preform 2 having a variety of shapes corresponding to a shape and the like of a liquid container C after molding can be used.

REFERENCE SIGNS LIST 1 liquid container manufacturing apparatus
2 preform
2a mouth
2b body
10 mold for blow molding
11 cavity
20 nozzle unit
21 main body block
22 support block
23 blow nozzle
23a liquid supply port
24 supply path
25 supply port
26 seal body
27 axial body
28 stretching rod
28a mounting groove
30 pressurized liquid supply source
30a cylinder
30b piston
31 supply tank
32 pressure gauge
40 inflation body
41 pressurized air supply path
42 branch path
43 pressurized air supply source
C liquid container
L liquid
P1 pipe
V1 opening-closing valve
HS headspace

The invention claimed is:

1. A liquid container manufacturing method of manufacturing a liquid container that contains a content liquid from a synthetic resin preform, the method comprising:
   an inflation body insertion step of inserting an inflation body into the preform placed in a mold for blow molding;
   an air discharge step of discharging air out of the preform by inflating the inflation body with elastic deformation in the preform;
   a mouth blocking step of blocking a mouth of the preform with the inflation body inflated in the preform;
   an inflation body contraction step of contracting the inflation body with the mouth blocked; and
   a liquid blow molding step of molding the preform into a liquid container having a shape conforming to an inner surface of the mold for blow molding by supplying, after the inflation body contraction step, a pressurized liquid into the preform through a blow nozzle, wherein, in the inflation body contraction step, the inflation body is contracted without supplying liquid into the preform, and wherein, in the inflation body contraction step, the inflation body is contracted by elastic restoration force of the elastic deformation of the inflation body and a contraction of the inflation body causes a negative pressure in the preform.

2. The liquid container manufacturing method according to claim 1, further comprising a rod stretching step of axially stretching the preform by a stretching rod before or during the liquid blow molding step, wherein the inflation body is provided to the stretching rod.

3. The liquid container manufacturing method according to claim 2, further comprising:
- a liquid discharge step of discharging a predetermined amount of liquid out of the liquid container after molding through the blow nozzle, after the liquid blow molding step; and
- a headspace forming step of generating a predetermined amount of headspace in the liquid container by separating the blow nozzle from the mouth of the liquid container after a predetermined amount of liquid is discharged from the liquid container.

4. The liquid container manufacturing method according to claim 3, wherein the liquid discharge step is performed by sucking back a predetermined amount of liquid from the liquid container after molding through the blow nozzle.

5. The liquid container manufacturing method according to claim 2, further comprising a rod withdrawing step of separating the stretching rod from the liquid container after the liquid blow molding step.

6. The liquid container manufacturing method according to claim 5, further comprising:
- a liquid discharge step of discharging a predetermined amount of liquid out of the liquid container after molding through the blow nozzle, after the liquid blow molding step; and
- a headspace forming step of generating a predetermined amount of headspace in the liquid container by separating the blow nozzle from the mouth of the liquid container after a predetermined amount of liquid is discharged from the liquid container.

7. The liquid container manufacturing method according to claim 6, wherein the liquid discharge step is performed by sucking back a predetermined amount of liquid from the liquid container after molding through the blow nozzle.

8. The liquid container manufacturing method according to claim 1, further comprising:
- a liquid discharge step of discharging a predetermined amount of liquid out of the liquid container after molding through the blow nozzle, after the liquid blow molding step; and
- a headspace forming step of generating a predetermined amount of headspace in the liquid container by separating the blow nozzle from the mouth of the liquid container after a predetermined amount of liquid is discharged from the liquid container.

9. The liquid container manufacturing method according to claim 8, wherein the liquid discharge step is performed by sucking back a predetermined amount of liquid from the liquid container after molding through the blow nozzle.

* * * * *